US010678682B2

(12) United States Patent
Chauhan et al.

(10) Patent No.: US 10,678,682 B2
(45) Date of Patent: Jun. 9, 2020

(54) INTELLIGENT BATCH JOB TESTING

(71) Applicant: Bank of America Corporation, Charlotte, NC (US)

(72) Inventors: Sandeep Kumar Chauhan, Hyderabad (IN); Koteswara Rao Ventaka Magham, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 242 days.

(21) Appl. No.: 15/830,169

(22) Filed: Dec. 4, 2017

(65) Prior Publication Data

US 2019/0171553 A1 Jun. 6, 2019

(51) Int. Cl.
| | | |
|---|---|---|
| *G06F 11/00* | (2006.01) | |
| *G06F 11/36* | (2006.01) | |
| *G06N 5/02* | (2006.01) | |
| *G06N 20/00* | (2019.01) | |
| *G06N 5/00* | (2006.01) | |

(52) U.S. Cl.
CPC ...... *G06F 11/3688* (2013.01); *G06F 11/3684* (2013.01); *G06N 5/003* (2013.01); *G06N 5/022* (2013.01); *G06N 20/00* (2019.01)

(58) Field of Classification Search
CPC ............. G06F 11/0706; G06F 11/0718; G06F 11/3612; G06F 11/3636; G06F 11/366; G06F 11/3668; G06F 11/3672; G06F 11/3688
USPC ........................................................ 714/38.1
See application file for complete search history.

(56) References Cited

U.S. PATENT DOCUMENTS

| | | | |
|---|---|---|---|
| 7,934,127 B2 | 4/2011 | Kelso | |
| 7,958,495 B2 | 6/2011 | Kelso | |
| 8,020,044 B2 | 9/2011 | Martinov | |
| 8,239,757 B2 | 8/2012 | Johnson et al. | |
| 8,239,835 B2 | 8/2012 | Rex et al. | |
| 8,301,935 B2 | 10/2012 | Martinov | |
| 8,984,339 B2 | 3/2015 | Ahmed et al. | |
| 8,984,340 B2 | 3/2015 | Ahmed et al. | |
| 9,081,899 B2 | 7/2015 | Ahmed et al. | |
| 9,189,377 B1 | 11/2015 | Arkadyev | |
| 9,317,411 B2 | 4/2016 | Kalyanasundram | |
| 9,524,229 B2 | 12/2016 | Kalyanasundram | |
| 9,524,230 B2 | 12/2016 | Kalyanasundram | |
| 9,582,408 B1 | 2/2017 | Jayaraman et al. | |
| 2007/0174223 A1* | 7/2007 | Holmes .................. | G06N 5/025 706/47 |

(Continued)

*Primary Examiner* — Sarai E Butler
(74) *Attorney, Agent, or Firm* — Weiss & Arons LLP; Michael A. Springs, Esq.

(57) ABSTRACT

Apparatus and methods for an intelligent batch job testing system are provided. The system may receive a natural language request for batch job testing. The system may generate a graphical representation of a test scenario, based in part on keywords extracted from the natural language request. The graphical representation may include interconnected nodes. The graphical representation may include finite states for one or more of the nodes. The system may generate test cases based on the graphical representation. The system may access batch job data and map the data files using an optimized file layout that corresponds to the batch job data file. Feedback based on test results may be applied to modify test cases and testing protocols to improve testing accuracy.

20 Claims, 3 Drawing Sheets

(56) References Cited

U.S. PATENT DOCUMENTS

| | | | |
|---|---|---|---|
| 2013/0326294 A1* | 12/2013 | Lo .......................... | G11C 29/16 |
| | | | 714/718 |
| 2015/0324274 A1* | 11/2015 | Raghavan ........... | G06F 11/3684 |
| | | | 717/124 |
| 2016/0196197 A1* | 7/2016 | Hamid ............... | G01R 31/3177 |
| | | | 714/33 |
| 2016/0246800 A1* | 8/2016 | Soeder ................ | G06F 21/562 |
| 2016/0328837 A1* | 11/2016 | He ....................... | G06T 7/0004 |
| 2017/0068614 A1* | 3/2017 | Jayaraman ........... | G06F 16/285 |
| 2017/0344467 A1* | 11/2017 | Yadav ................ | G06F 11/3688 |

\* cited by examiner

INTELLIGENT BATCH JOB TESTING

FIELD OF TECHNOLOGY

This disclosure relates to batch job testing. In particular, the disclosure relates to an intelligent batch job testing system configured to independently generate and execute test cases for batch jobs.

BACKGROUND

Testing of batch data presents a unique set of technical challenges. Conventional testing tools are typically designed to work in concert with a user interface and are not suitable for batch jobs. Testing batch data requires a significant investment of resources to manually design test scenarios and test cases with full coverage of the batch job.

Further, execution of batch job test cases typically requires intervention by a system administrator to identify data sources for the batch job files and locate the batch job data within the files. Batch job files typically do not include metadata that would enable the system to identify of the relevant data fields.

It would be desirable to provide an intelligent batch job testing system that is configured to independently generate and execute test cases for batch jobs.

It would be desirable to incorporate machine learning algorithms that would allow the system to continually improve the accuracy and efficiency of the batch job testing.

SUMMARY OF THE DISCLOSURE

Apparatus and methods for an intelligent batch job testing system are provided.

The system may be receive a natural language request for a batch job test and extract keywords from the request.

The system may generate a scenario graph that represents a test scenario. The scenario graph may be based in part on keywords from the request. The scenario graph may be based in part on process flows associated with the keywords. The scenario graph may include interconnected nodes. The scenario graph may include finite states for one or more nodes. The scenario graph may be generated without manual intervention.

The system may generate one or more test cases based on the scenario graph. The system may access batch job files from a data source and execute the test cases. The system may map the batch job files using an optimized file layout. The optimized file layout may be generated using machine learning algorithms based on metadata from sample files.

The system may store executed test cases and test results. Feedback based on the test results may be applied to update test case requirements and improve testing accuracy.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION

Figure 1:
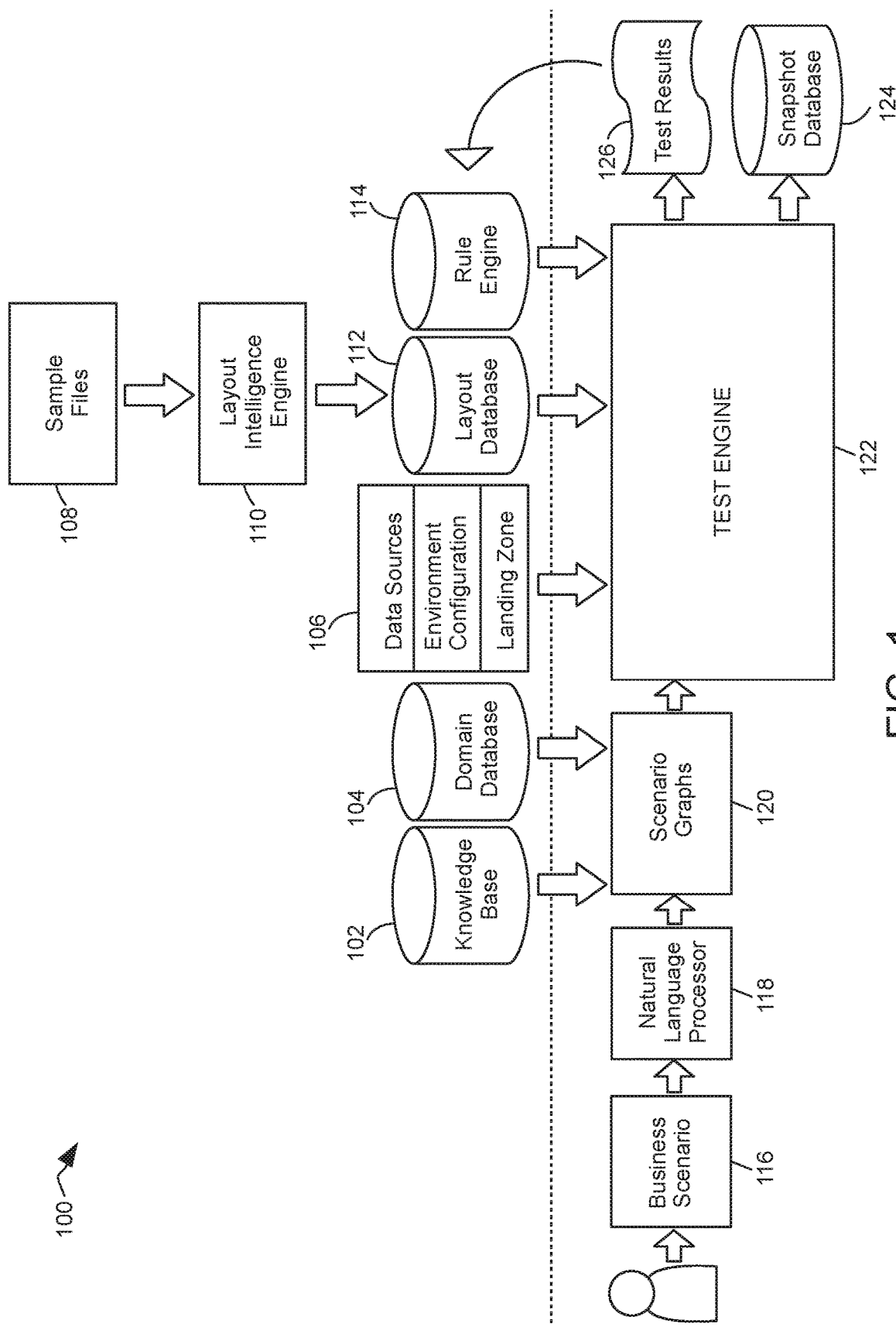
FIG. 1 shows an illustrative hybrid apparatus/flow diagram in accordance with principles of the invention.

Apparatus and methods for intelligent batch job testing incorporating semi-supervised machine learning are provided.

For the sake of illustration, the invention will be described as being performed by a "system." The system may include one or more features of the apparatus and methods that are shown or described herein and/or any other suitable device or approach. The "system" may be provided by an entity. The entity may be an individual, an organization or any other suitable entity.

Test Scenarios and Test Cases

Batch job testing typically requires manual design of test scenarios and manual creation of test cases. An intelligent batch job testing system may be configured using machine learning to independently design test scenarios and execute test cases.

A test scenario may be understood as a high level determination of what is to be tested. In a simple illustrative example, a test scenario may verify that only registered users may log into a website. In some cases, a test scenario may encompass an end-to-end review of a batch job process.

Test cases detail the specific steps for how the testing is to be accomplished. The high level test scenario may be broken down into a set of specific actions that each has an expected outcome. These actions may be independent of each other, or may be a series of progressive steps. With regard to the simple login test scenario above, one action might be that when a user tries to open a login window, the window opens. A second action might be that when a user enters a valid user name and password, the application launches. A third action might be that when a user enters a valid user name with an invalid password, the application does not launch. The functionality of each of these individual actions may be evaluated with separate test cases.

Each test case may encompass a test script. The test script may be computer executable code that implements the test case in a machine environment.

Scenario Graph Generator

The intelligent batch job testing system may initially generate a graphical representation of a test scenario. The graphical representation may be referred to as a scenario graph. The scenario graph structure may enable the system to independently transition from a high level test scenario to specific test cases.

The intelligent batch job testing system may include a natural language processor. The natural language processor may receive a natural language request for batch job testing. The request may be received from a system user, a system administrator or any suitable party. The request may be phrased using conventional business terminology. In an illustrative example, the system may receive a request to test digital wallets for active cards.

The natural language processor may use tokenization or any other suitable process to extract keywords from the natural language request. The natural language processor may provide tagged output. In the example involving digital wallet testing, the natural language processor may identify the keywords "digital wallet" and "active cards."

The intelligent batch job testing system may include a scenario graph generator. Starting with the keywords extracted by the natural language processor, the scenario graph generator may create a representation of a test scenario in a graphical form. In some cases, the natural language request may involve multiple test scenarios and necessitate the creation of a plurality of separate scenario graphs.

The scenario graph generator may access a knowledge base. The knowledge base may be a repository that includes various types of process flows relating to the testing field. Illustrative knowledge base data may include use cases, sequence diagrams, requirement documents, and system architecture. The knowledge base may include logic that enables the system to draw conclusions about test scenarios. The knowledge base may be updated with new data or modified by a system administrator on an ongoing basis.

The scenario graph may access knowledge base flows related to one or more of the keywords identified by the natural language processor. In the example above involving the digital wallet, the knowledge base may identify a process flow that relates to a digital wallet. For example, the knowledge base may identify a use case detailing the actors and actions involved in validating a card from a digital wallet.

The scenario graph generator may access a domain database. The domain database may store data relating to the set of values available for an attribute. The domain database may store information related to specific cases using finite state machine representation. The finite states from the domain database may include alternate states for scenario graph elements. In the example involving the digital wallet, finite states may include whether the card exists, whether the card is active or blocked, or the type of card. These finite states may be represented in the scenario graph. The domain database may be updated with new data or modified by a system administrator on an ongoing basis.

The scenario graph may be a classification tree. The classification tree may include a plurality of nodes. Connections between nodes may denote relationships between the nodes. The relationships between nodes may be based on knowledge base process flows, use cases, or any other suitable data. The classification tree may include parent and child nodes, in which a child node is a sub-category of a parent category. The classification tree may include nodes representing sequential steps. In some embodiments, each node may be developed into a separate scenario graph. The system may use input from the domain database to identify the possible finite states for nodes in the classification tree.

Intelligent Test Engine

The system may include an intelligent test engine. The test engine may use a scenario graph to generate a set of test cases that together cover all aspects of the represented test scenario.

The test cases may be based in part on the scenario graph. Nodes on the scenario graph may be converted to test cases. In some situations, a node on the scenario graph may be converted to multiple test cases.

Each finite state included in the scenario graph may be verified in a separate test case. In the example involving the digital wallet, finite states may include "card exists," "card active" and "card blocked," as well as the type of card. An illustrative test case may be generated for batch job testing of wallets with an existing MasterCard® that is blocked.

The intelligent test engine may receive additional test case requirements from a rule engine. The rule engine may store requirements that are based on previous executions of a test case. A batch job test case generated from the scenario graph may be one that has been previously executed by the system. Based on outcomes from previous executions of the same test case, a system administrator may create or modify test case requirements. For example, a rule engine may include instructions that a specific type of test case should use only data from a single U.S. State.

The intelligent test engine may access requirements from the rule engine before executing the test case. In some embodiments, if the test case does not satisfy an applicable rule, the test case may be eliminated. The test case requirements stored in the rule engine may be adjusted based on new test result data. The requirements may be adjusted by a system administrator or by any suitable party.

The test case requirements stored in the rule engine may be configured in a decision tree format. The rules may relate to a specific test case. The test engine may access the requirements before running the test case.

Execution of the test cases may require access to entity batch job data. The batch job data may be maintained in an entity system of record. The intelligent test engine may receive an input identifying data sources for batch job data. The system may receive an input defining the environment configuration for the data sources. The system may receive an input identifying a landing zone for data staging. The landing zone may specify a file location for logging test results. Data source, environment configuration and landing zone inputs may enable the test engine to retrieve the batch job files to be tested with little or no manual intervention. The inputs may be entered by a system administrator or transmitted by the system.

The test engine may access mapping information for the batch job files to be tested. Batch job files often do not include the metadata that would allow the system to locate the relevant data fields. The mapping information may identify the relevant data fields within the batch job files. The mapping information may be an optimized file layout. The optimized file layout may be a template that corresponds to the batch job file. The optimized file layout may be generated using supervised or semi-supervised machine learning algorithms, as set forth below.

Following test case execution, the intelligent batch job testing system may log test results for the executed test cases.

Batch job test results may be captured in a snapshot database. The snapshot database may store executed test cases and test scripts. Test results for each test case or test script may also be stored in the snapshot database. The snapshot database enables the system to access stored test scripts from the snapshot database in place of re-creating test scripts that have previously been generated by the system.

The snapshot database may be audited by a system administrator or by any suitable party. Based on the test results, feedback may be provided to improve system performance.

Test script failure data may be manually evaluated. In some cases, a test script failure may be due to an error in the test script that was generated by the test engine. In some cases, a failure may be due to an error in identification of the data source or environment parameters so the batch job data could not be located.

The system administrator may provide feedback information directly to the test engine. For example a confidence level may be associated with a test case. The confidence level may be determined by a system administrator or any suitable party or system. The confidence level may be determined based in part on test results. After each execution of a test case, the confidence level may be updated. If a test script failure is not caused by an error in the test script itself, the failure may not impact the confidence level for the corresponding test case.

The intelligent test engine may include one or more machine learning algorithms. Initially, the test engine may depend on supervised training, but may evolve to test new batch jobs autonomously. The test engine may use support vector machines or any suitable machine learning algorithm to modify protocols for generating and executing test cases.

A system administrator may provide feedback through modifications to the rule engine. A system administrator may provide feedback through modifications to the domain database. This feedback, combined with machine learning within the test engine, allows the system to develop to the point where it is able to generate and execute test cases without manual intervention.

Layout Intelligence Engine

The intelligent batch job testing system may include a layout intelligence engine. The layout intelligence engine may receive inputs of sample data files. The layout intelligence engine may deconstruct the content of each type of data file. The sample files may include metadata associated with the file. The metadata may include formatting information, layout information, or any other suitable identifying information associated with the file data. For example, based on the sample files, the layout intelligence engine may learn that a field titled "PartyID" is 8 characters long, or that a field for a customer first name has a length between 25 and 50 characters.

The layout intelligence engine may develop an optimized file layout based on the sample files. Sample files from different entity departments may have different parameters for the same field. For example, some sample files may allocate 25 characters to a first name field and some may allocate 40 or 50 characters. The layout intelligence engine may optimize metadata for a plurality of the file fields. The layout intelligence engine may generate an optimized file layout based on the optimized metadata.

In some embodiments, alternate parameters from the sample files may be stored in a database. In some embodiments, the layout intelligence engine may generate multiple alternate optimized file layouts that are customized to correspond to different file sources. An optimized file layout may be adjusted based on updated system information. An optimized file layout may be adjusted by a system administrator, by machine learning algorithms or by any suitable party.

The layout intelligence engine may include supervised or semi-supervised machine learning. Input from system administrators may verify and correct the file mapping. While the system is maturing, the layout intelligence engine may keep updating the metadata associated with the data in the sample files. Once matured, the layout intelligence engine may automatically map a file layout and access the relevant batch job data for testing.

The intelligent batch job testing system may include a layout database. The layout database may store one or more optimized file layouts. The layout database may store alternative file parameters for an optimized file layout. During testing, mapping information from the layout database may be applied to test batch job data from entity data sources. The mapping information may enable the intelligent test engine to interpret the batch job data files and execute the test cases.

The intelligent batch job testing system may include a learning phase and an execution phase. In the learning phase, the layout intelligence engine may develop an optimized file layout based on sample data files. In the learning phase, the rule engine and the test engine may modify testing protocols based on input from an administrator regarding past test results. In the execution phase, the system may apply the training from the learning phase to independently generate and execute test cases.

The intelligent batch job testing system may incorporate any suitable supervised or semi-supervised machine learning algorithm. The learning algorithm may be a support vector machine. The support vector machine may be configured for linear or non-linear classification, regression analysis or any suitable algorithm. The support vector machine may use a training algorithm to build models for classification.

The intelligent batch job testing system may include non-transitory machine readable memory. The non-transitory memory may store computer executable instructions. The intelligent batch job testing system may include a processor configured to execute the computer executable instructions. For example, a processor circuit may be embedded in an integrated circuit board of the batch job testing system. The processor may control overall operation of the testing system and its associated components.

The intelligent batch job testing system may include RAM, ROM, an input/output ("I/O") module and a non-transitory or non-volatile memory. The I/O module may include a microphone, button and/or touch screen which may accept user provided input. The I/O module may include one or more of a speaker for providing audio output and a display for providing textual, audiovisual and/or graphical output.

Computer executable instructions such as software applications may be stored within the non-transitory memory and/or other storage media. The software may provide instructions to the processor that enable the batch job testing system to perform various functions. For example, the non-transitory memory may store software used by the batch job testing system, such as an operating system, application programs, web browser and a database. Alternatively, some or all of computer executable instructions of the batch job testing system may be embodied in hardware or firmware components of the system.

Software application programs, which may be used by the batch job testing system, may include computer executable instructions for invoking user functionality related to communication, such as email, short message service ("SMS"), and voice input and speech recognition applications. Application programs may utilize one or more algorithms that generate optimized file layouts, generate scenario graphs, generate test cases, perform data analytics or any other suitable tasks.

The intelligent batch job testing system may operate in a networked environment. For example, the batch job testing system may support network connections to other systems within the complex web and patch servers storing software patches. The batch job testing system may support establishing network connections to one or more remote computers. Such remote computers may be nodes on a network. The nodes may be personal computers or servers that include many or all of the elements described above relative to the batch job testing system.

The network connections may include a local area network ("LAN") and a wide area network ("WAN"), and may also include other networks. When used in a LAN networking environment, the batch job testing system may be connected to the LAN through a network interface or adapter. The communication circuit may include the network interface or adapter.

When used in a WAN networking environment, the batch job testing system may include a modem or other means for establishing communications over a WAN, such as the Internet. It will be appreciated that the existence of any of various well-known protocols such as TCP/IP, Ethernet, FTP, HTTP and the like is presumed, and the batch job testing system can be operated in a client-server configuration to permit a user to retrieve web pages from a web-based server. Web browsers can be used to display and manipulate data on web pages.

The intelligent batch job testing system and network nodes may include various other components, such as a battery, a speaker, and antennas. For example, network nodes may be portable devices such as a laptop, a tablet, chat-bot, a smartphone or any other suitable device for receiving, storing, transmitting and/or displaying relevant information.

The intelligent batch job testing system may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The intelligent batch job testing system may utilize computer-executable instructions, such as program modules, executed by a computer. Generally, program modules include routines, programs, objects, components, data structures, etc. that perform particular tasks or implement particular data types. The batch job testing system may be operational with distributed computing environments where tasks are performed by remote processing devices that are linked through a communications network. In a distributed computing environment, program modules may be located in both local and remote computer storage media including memory storage devices.

A device that accesses the batch job testing system that may include one or more features of the batch job testing system. For example, an accessing device may be a smart phone, desktop computer or other device. The accessing device may be operated by a system administrator. For example, a system administrator may use the accessing device to review test results and modify test case requirements.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

Processes in accordance with the principles of the invention may include one or more features of the processes illustrated in the FIGS.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows illustrative hybrid apparatus/process flow 100. The portion of process 100 above the broken line may involve intelligent batch job testing system setup and learning. Knowledge base 102 may include process flows, use cases and other system diagrams. Domain database 104 may store finite state information. At step 106, the system may be configured to access entity data sources. Inputs may include information related to batch job data sources, environment configuration and landing zones.

Aspects of the setup phase may involve semi-supervised learning based on input from system administrators or other parties. At 108, sample files are entered into the system. At 110, a layout intelligence engine deconstructs the files and generates an optimized file layout based on metadata from the sample files. The optimized file layout along with alternate data field metadata may be stored in layout database 112. Rule engine 114 may receive feedback from system administrators based on test results from executed test cases. Test case requirements stored by the rule engine may be modified based on updated test results.

The portion of process 100 below the broken line may involve intelligent batch job testing system execution. At step 116, a request for testing is received from a business user. Natural language processor 118 may process the request and extract keywords. Scenario graph generator 120 may generate a scenario graph based on input from natural language processor 118, knowledge base 102 and domain database 104.

Test engine 122 may generate test cases and test scripts based on the scenario graph. Test engine 122 may access entity data sources. Test engine 122 may access the batch job data files and identify batch job data for testing. Test engine 122 may receive input from the rule engine regarding test case requirements. One or more machine learning algorithms may modify protocols for generating test cases based on input from the rule engine.

Test scripts and test outcomes may be stored in snapshot database 124. Test results 126 may be evaluated by a system administrator. Based on test results 126, a system administrator may provide feedback to the rule engine regarding an executed test case.

Figure 2A:
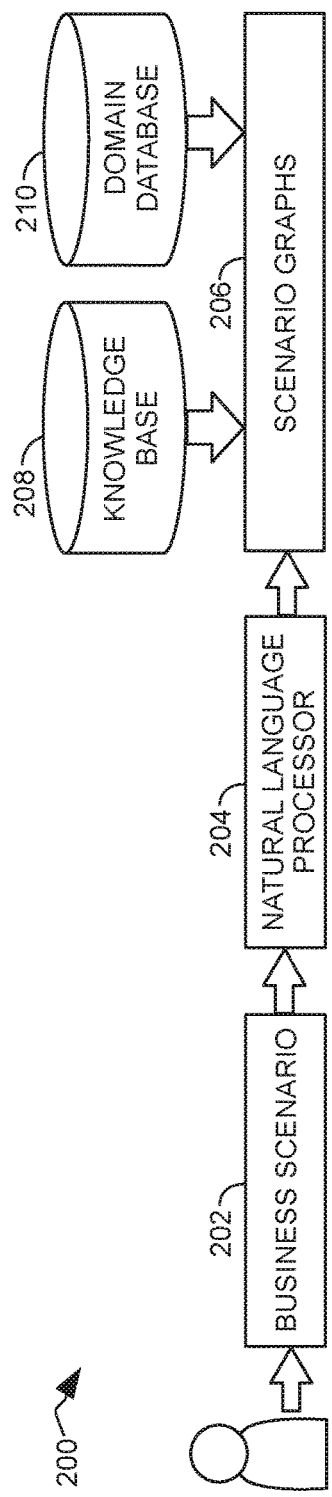
FIGS. 2A and 2B show illustrative hybrid apparatus/flow diagrams in accordance with principles of the invention.
Figure 2B:
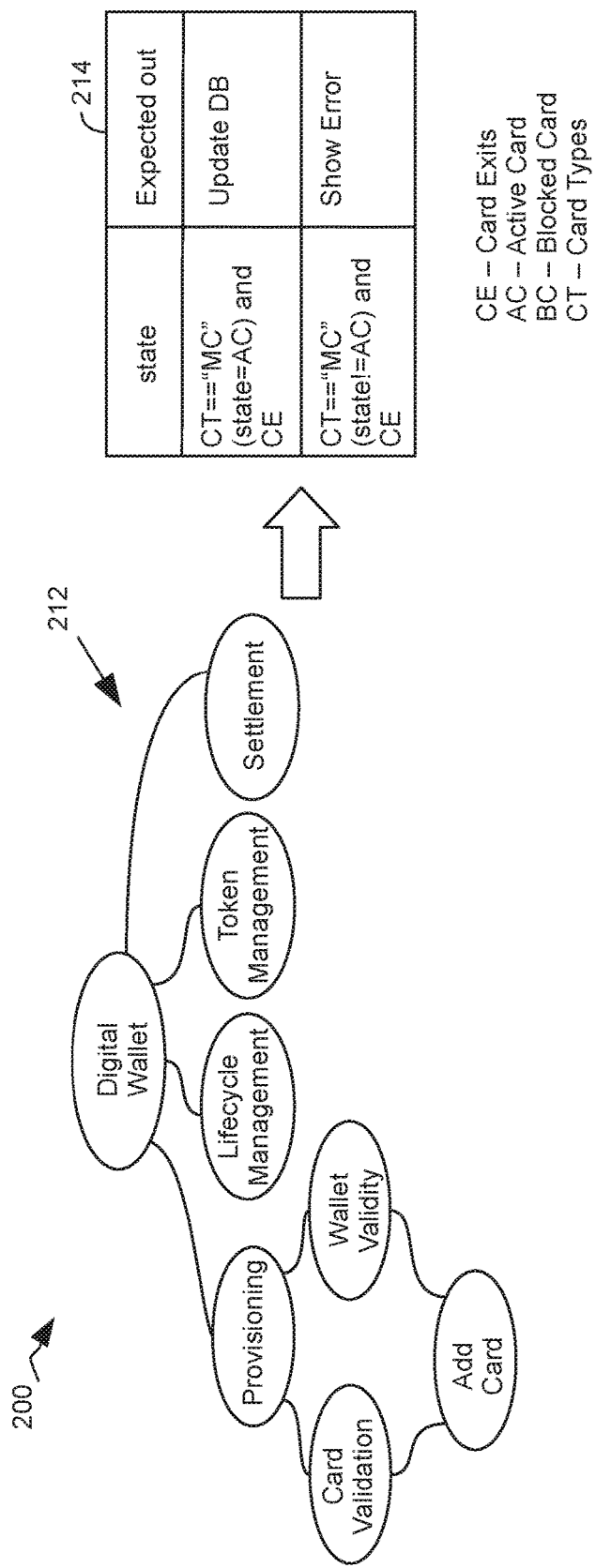

FIGS. 2A and 2B show illustrative hybrid apparatus/process flow 200. One or more of the elements shown in FIGS. 2A and 2B may correspond to elements shown in FIG. 1.

In FIG. 2A, apparatus/process flow 200 illustrates generation of a scenario graph. At step 202, a request for testing is received from a business user. In process 200, the request may involve testing a digital wallet for eligible cards. Natural language processor 204 may process the request and extract the term "digital wallet." At step 206 scenario graphs may be generated based on the term "digital wallet" using data from knowledge base 208 and domain database 210.

FIG. 2B shows illustrative scenario graph 212 which is based on the term "digital wallet" and on data from knowledge base 208 and domain database 210. Sample test cases 214 may be generated for the "add card" node in the scenario graph. The sample test cases shown in process 200 involve states where the card is a MasterCard®, the card exists and the card is active.

Figure 3:
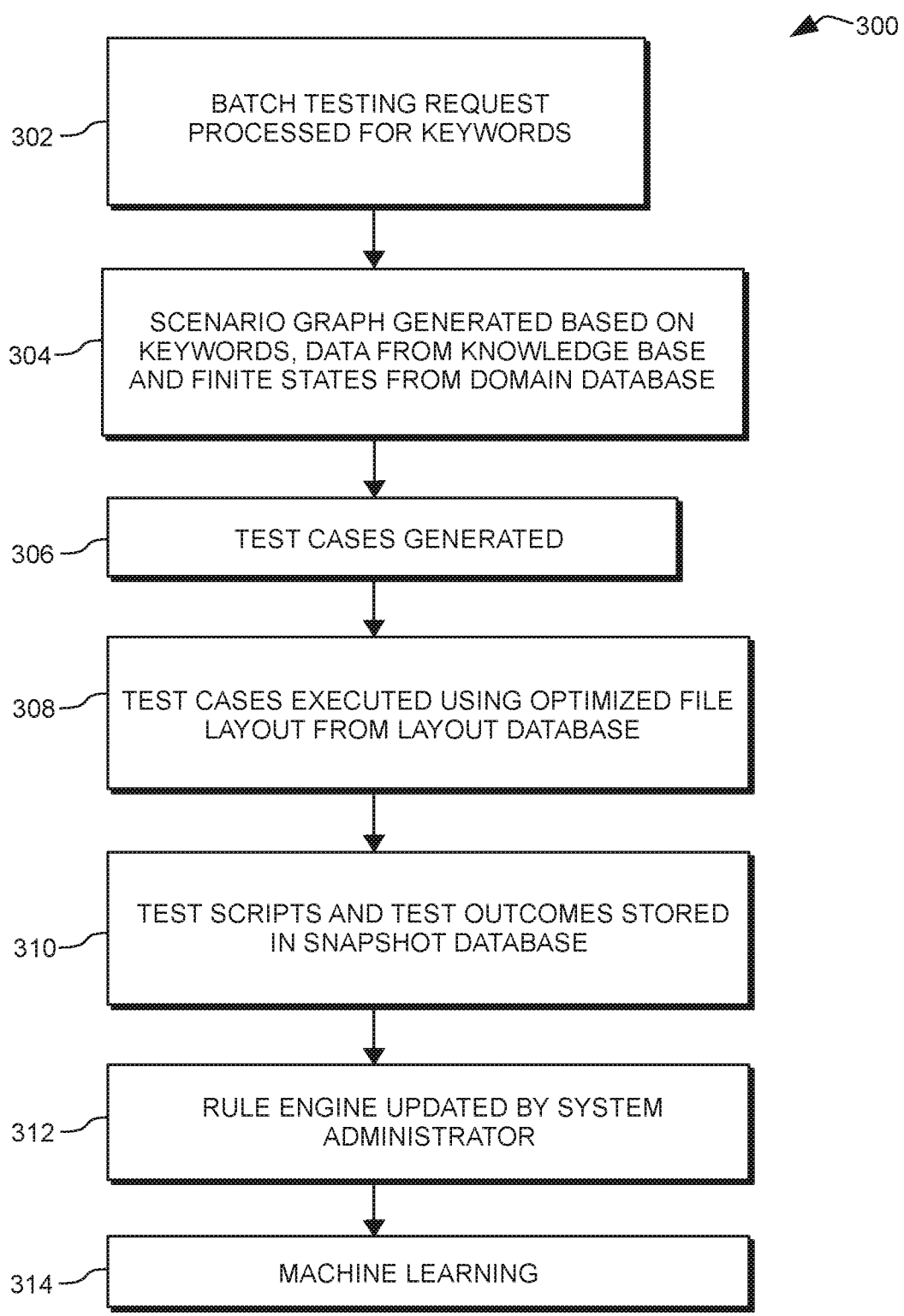
FIG. 3 shows an illustrative process flow in accordance with principles of the invention.

FIG. 3 shows illustrative process flow 300. At step 302 a batch testing request is processed by a natural language processor and keywords are identified. At step 304 a scenario graph is generated based on the keywords. The scenario graph may also be based on process flows from a knowledge base and finite state data from a domain database to generate the scenario graph. At step 306, test cases are generated based on the scenario graph. Test case requirements may also be received from a rule engine. The test cases may include test scripts. At step 308, the test cases are executed. The system may use a previously prepared optimized file layout to map the batch job files and execute the test cases. At step 310, test scripts and test outcomes are stored in a snapshot database. At step 312, the rule engine is updated by a system administrator based on the test outcomes. At step 314, system administrator inputs improve accuracy via machine learning.

Thus, apparatus and methods for an intelligent batch job testing system incorporating semi-supervised machine learning are provided. Persons skilled in the art will appreciate that the present invention can be practiced by other than the described embodiments, which are presented for purposes of illustration rather than of limitation. The present invention is limited only by the claims that follow.

What is claimed is:

1. A batch job testing system configured to generate and execute batch job test cases based on a natural language test scenario, the batch job testing system comprising a processor configured to:
   receive a natural language request for a batch job test;
   generate one or more scenario graphs, each scenario graph comprising a graphical representation of a test scenario, the test scenario based at least in part on a keyword extracted from the natural language request, each scenario graph comprising a plurality of scenario graph nodes;
   generate one or more test cases, each test ease based at least in part on a scenario graph node and based at least in part on domain data comprising finite states associated with the scenario graph node;
   map a data file to identify batch job data associated with a test case, the mapping based on an optimized file layout corresponding to a layout of the data file;
   execute one or more test cases using the batch job data; and
   based on the execution of the one or more test cases, compile batch job test results.

2. The batch job testing system of claim 1, the batch job testing system further comprising a layout intelligence engine, wherein the layout intelligence engine is configured to:
   receive an input of one or more sample files, each sample file comprising data and metadata; and
   based on metadata from the sample files use a machine learning algorithm to generate one or more optimized file layouts.

3. The batch job testing system of claim 1, the batch job testing system further comprising a rule engine, wherein:
   the rule engine is configured to store decision tree information comprising one or more test case requirements, the test case requirements based on test results associated with a first test case; and
   the processor is configured to generate a second test case based in part on one or more of the test case requirements.

4. The batch job testing system of claim 1, wherein the processor is further configured to:
   store a confidence level for a test case, the confidence level based at least in part on first test results associated with a first execution of a test case; and
   execute a second execution of the test case only when the confidence level exceeds a pre-determined threshold.

5. The batch job testing system of claim 4, wherein the confidence level is modified by a system administrator based on second test results associated with the second execution.

6. The batch job testing system of claim 1, the batch job testing system further comprising a database configured to store executed test cases, executed test scripts and test results associated with the executed test scripts.

7. The batch job testing system of claim 6, wherein the processor is configured to execute a test case by accessing an executed test script stored in the database.

8. The batch job testing system of claim 1, wherein the processor is configured to generate a plurality of scenario graphs corresponding to a single natural language request for a batch job test, each scenario graph comprising a graphical representation of a test scenario.

9. A machine-learning based batch job testing system configured to generate and execute batch job test cases based on a natural language testing request, the batch job testing system comprising:
   machine-readable storage configured to store an optimized file layout corresponding to a batch job source file, the optimized file layout generated based on sample file metadata using one or more machine-learning algorithms; and
   a processor configured to:
      receive a natural language request for a batch job test and identify one or more tokens within the request;
      based at least in part on one of the tokens, generate a scenario graph, the scenario graph comprising a plurality of scenario graph nodes;
      based at least in part on a scenario graph node and based at least in part on domain data comprising one or more finite states associated with the scenario graph node, generate one or more test cases;
      based at least in part on the optimized file layout, map the batch job source file to identify batch job data and execute the one or more cases; and
      update a rule engine based on test results associated with the one or more executed test cases, the rule engine comprising one or more decision trees corresponding to one or more executed test cases.

10. The batch job testing system of claim 9, wherein the processor is further configured to:
    store a confidence level for a test case, the confidence level based at least in part on first test results, the first test results associated with a first execution the test case; and
    execute a second execution of the test case only when the confidence level exceeds a pre-determined threshold.

11. The batch job testing system of claim 10, wherein the confidence level is modified by a system administrator based on second test results, the second test results associated with the second execution.

12. The batch job testing system of claim 9, wherein the test case corresponds to a test script, the test script comprising machine readable code configured to execute the test case in a machine environment.

13. The batch job testing system of claim 12, the system further comprising a database configured to store executed test cases, executed test scripts and test results associated with the executed test scripts.

14. The batch job testing system of claim 9, wherein the processor is configured to generate a plurality of scenario graphs corresponding to a single natural language request for a batch job test, each scenario graph comprising a graphical representation of a test scenario.

15. One or more non-transitory computer-readable media storing computer-executable instructions which, when executed by a processor on a computer system, perform a method for generating and executing batch job test cases based on machine learning, the method comprising:
   receiving a natural language request for a batch job test;
   generating a scenario graph, the scenario graph comprising a graphical representation of a test scenario, the test scenario based at least in part on a keyword extracted from the natural language request;
   generating one or more test cases, each test case based at least in part on the scenario graph;
   mapping a data file to identify batch job data associated with a test case, the mapping based on an optimized file layout corresponding to a layout of the data file;
   executing the test case using the batch job data;
   based on execution of the test case, compiling batch job test results; and
   updating a machine learning algorithm with one more test case requirements, the test case requirements based at least in part on the batch job test results.

16. The computer-readable media of claim 15, wherein the method further comprises:
   receiving an input of one or more sample files, each sample file comprising data and metadata; and
   using a machine learning algorithm, generating one or more optimized file layouts based on metadata from the sample files.

17. The computer-readable media of claim 15, wherein the method further comprises:
   storing decision tree information comprising test ease requirements, the test case requirements based on first test results associated with a first test case; and
   generating a second test case based in part on one or more of the test case requirements.

18. The computer-readable media of claim 15, wherein the method further comprises:
   storing a confidence level for a test case, the confidence level based at least in part on first test results associated with a first execution of a test case; and
   executing a second execution of the test case only when the confidence level exceeds a pre-determined threshold.

19. The computer-readable media of claim 15, wherein the method further comprises generating a plurality of scenario graphs corresponding to a single natural language request for batch job testing, each scenario graph comprising a graphical representation of a test scenario.

20. The computer-readable media of claim 15, wherein:
   the scenario graph comprises a plurality of scenario graph nodes; and
   each test case is based at least in part on a scenario graph node and on domain data comprising a finite state associated with the scenario graph node.

* * * * *